United States Patent [19]
Uftring et al.

[11] Patent Number: 5,340,399
[45] Date of Patent: Aug. 23, 1994

[54] APPARATUS FOR THE HEAT TREATMENT OF OPHTHALMIC LENSES, ESPECIALLY CONTACT LENSES

[75] Inventors: Winfried Uftring, Aleznau; Theo Bachmann, Heigenbrücken; Helmut Geis, Kleinostheim; Lothar Haase, Morsbach/Sieg, all of Fed. Rep. of Germany

[73] Assignee: Ciba-Geigy Corporation, Ardsley, N.Y.

[21] Appl. No.: 32,232

[22] Filed: Mar. 17, 1993

[30] Foreign Application Priority Data

Mar. 18, 1992 [EP] European Pat. Off. ........ 92810196.3

[51] Int. Cl.⁵ ................................................ F27B 9/16
[52] U.S. Cl. ........................................ 118/59; 118/400; 8/507; 427/164; 425/446; 432/153; 432/249
[58] Field of Search ................ 118/59, 400; 8/507; 427/164; 425/446; 432/121, 153, 249, 138

[56] References Cited

U.S. PATENT DOCUMENTS

| | | | |
|---|---|---|---|
| 3,741,553 | 6/1973 | Moore | 432/153 |
| 4,035,151 | 7/1977 | Czerny | 23/252 R |
| 4,048,472 | 9/1977 | Sauer | 432/134 |
| 4,255,129 | 3/1981 | Reed | 432/134 |
| 4,603,248 | 7/1986 | O'Connor | 219/388 |
| 4,620,851 | 11/1986 | Ryder | 8/507 |
| 4,705,370 | 11/1987 | Johnson | 8/507 |
| 4,786,249 | 11/1988 | Kaji et al. | 432/121 |
| 5,019,689 | 5/1991 | Bollier | 219/388 |
| 5,100,590 | 3/1992 | Rublin | 264/2.7 |

FOREIGN PATENT DOCUMENTS

| | | |
|---|---|---|
| 0058736 | 1/1982 | European Pat. Off. |
| 366545 | 5/1990 | European Pat. Off. |
| 2056031 | 3/1981 | United Kingdom |
| 8605528 | 9/1986 | World Int. Prop. O. |

*Primary Examiner*—W. Gary Jones
*Assistant Examiner*—John M. Hoffmann
*Attorney, Agent, or Firm*—Edward McC. Roberts; R. Scott Meece

[57] ABSTRACT

In an apparatus for the heat treatment of ophthalmic lenses, especially contact lenses, which comprises an approximately cylindrical housing of closed design having an inlet opening and an outlet opening, transport device for transporting the ophthalmic lenses located inside molds along an open transport path, which is arranged inside the housing and connects the inlet and the outlet opening, and heating device arranged inside the housing, the open transport path inside the housing is of an essentially spiral shape, and the heating device are arranged essentially above and below the transport path.

19 Claims, 3 Drawing Sheets

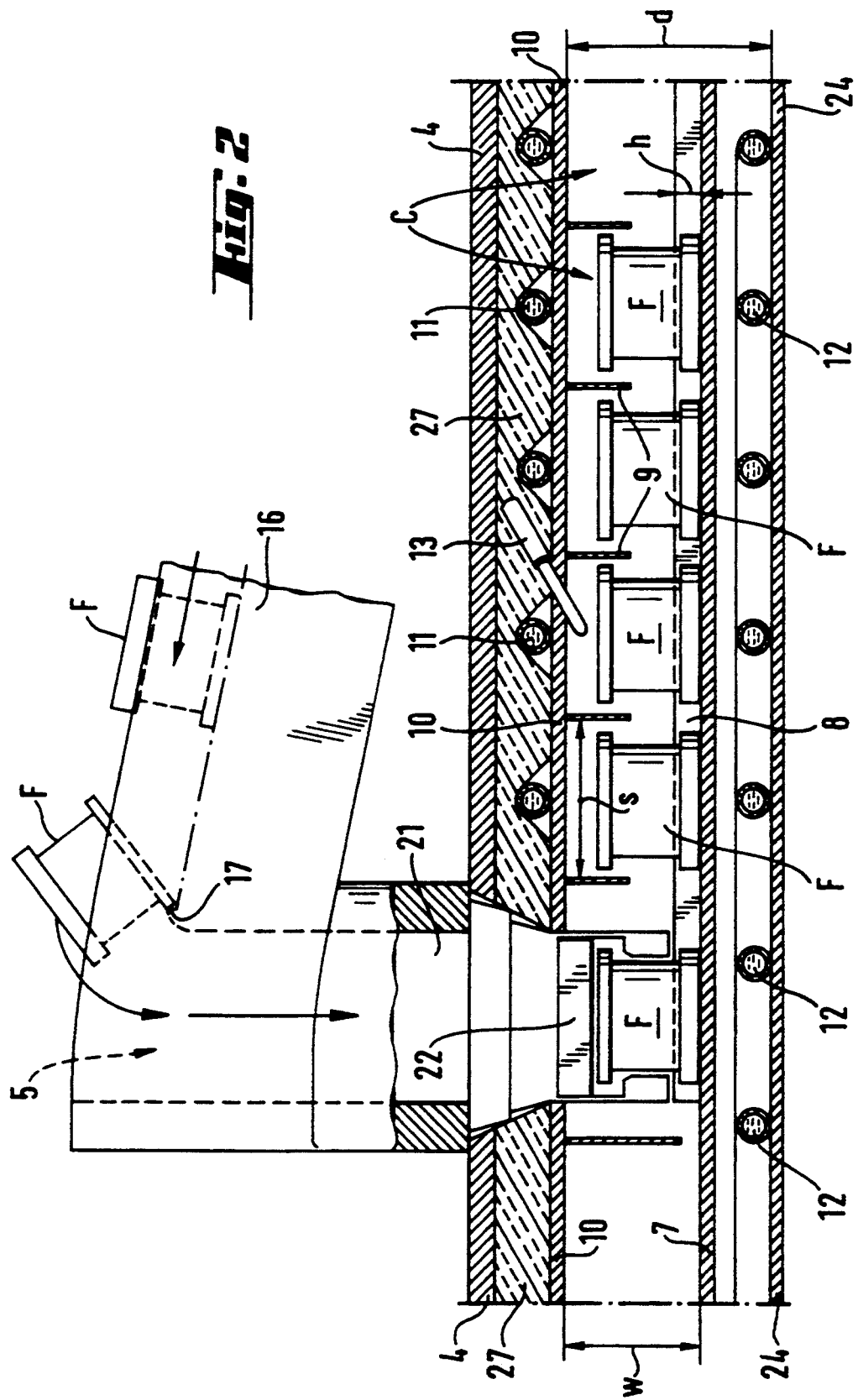

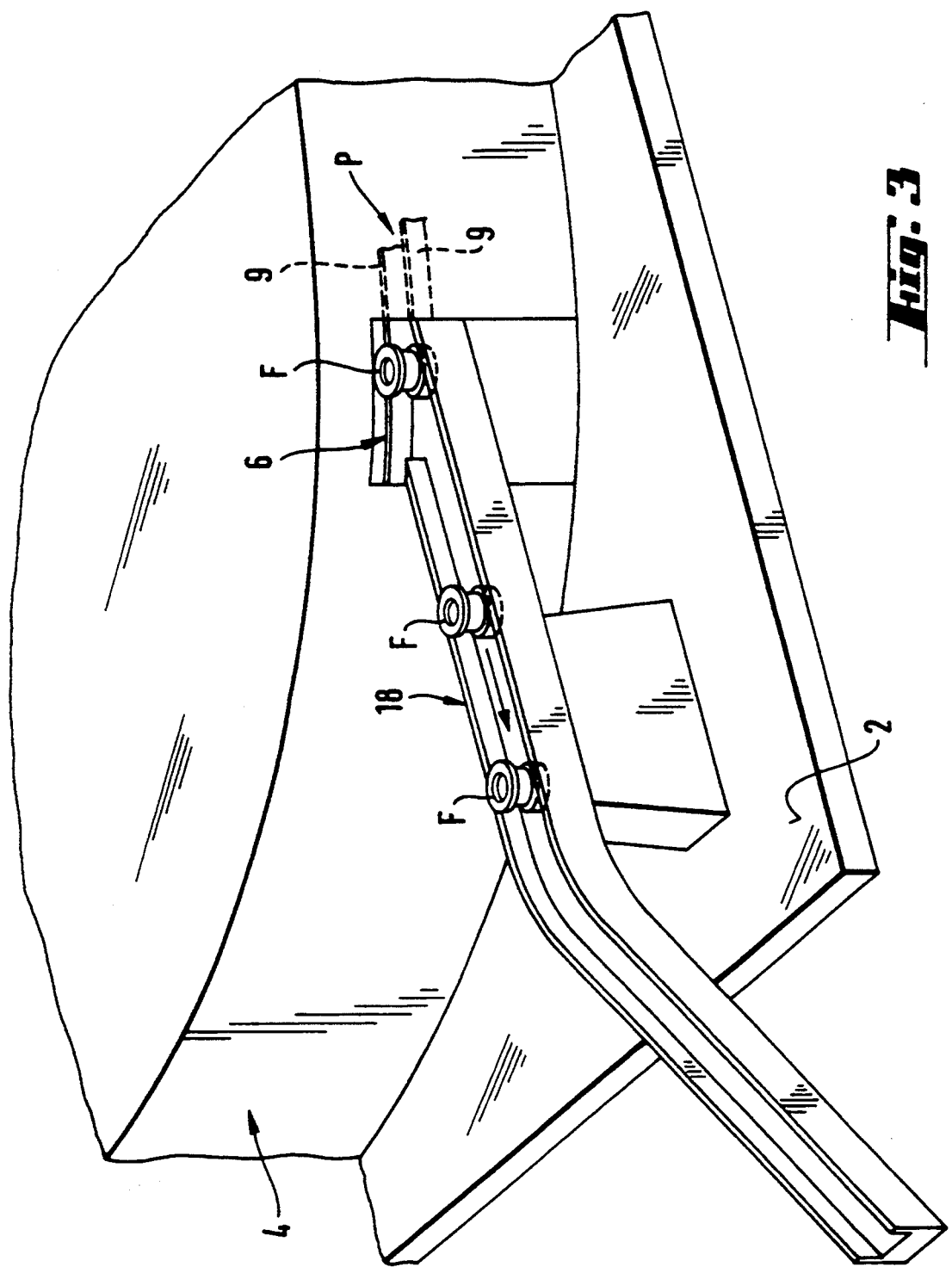

APPARATUS FOR THE HEAT TREATMENT OF OPHTHALMIC LENSES, ESPECIALLY CONTACT LENSES

FIELD OF THE INVENTION

The invention relates to an apparatus for the heat treatment of ophthalmic lenses, especially contact lenses.

The manufacture of ophthalmic lenses, especially contact lenses, includes in addition to a number of manufacturing steps, such as, for example, the production of casting moulds, the preparation of a monomeric mixture, the casting process, etc., also heat treatment steps. In many cases, for example, the polymerisation of the monomeric mixture introduced into the casting mould for the production of the ophthalmic lens is effected by introducing the filled mould into an oven-like receptacle and then carrying out the heat treatment. Lenses produced in that manner may be so-called semi-finished products which are shaped in further manufacturing steps to obtain the desired lenses, or alternatively may be contact lenses that are produced in a so-called one-step-casting process (full mould process).

In order to produce coloured contact lenses, for example iris contact lenses, an additional heat treatment step is required. In that step the contact lenses to be coloured are introduced into so-called dye moulds, and a particular volume of a dyestuff solution of the desired colour is added. In order to achieve permanent colouration of the contact lenses, the dye moulds containing the lenses and the dyestuff solution are then subjected to heat treatment for a predetermined period of time. After the heat treatment the coloured contact lenses can be removed and, if necessary, subjected to further treatment.

The heat treatment is in many cases carried out in a so-called "batch process" in which a number of casting moulds containing monomeric mixture, or of dye moulds containing the contact lenses to be coloured, are first of all introduced into a kind of oven. Once the oven is full it is heated up and the moulds are subjected to heat for the required amount of time. The oven is then cooled to a greater or lesser degree and the moulds can be removed.

Apart from the fact that that kind of heat treatment is very time-consuming and moreover requires close observation of the progress of the heat treatment, for which additional personnel are needed, in many cases there can be no guarantee that all of the lenses will be subjected to the same period of heat treatment. Also known is a so-called rotary oven which comprises a rotatable plate on which the moulds are placed and then transported slowly through an electrically heated heating chamber. The moulds are placed on and removed from the plate manually and through the same opening, so that a truly continuous operation is not possible. The residence times of the moulds in the oven are not of exactly the same length for all lenses, so that differences in quality may occur in the finished lenses. With that arrangement too, additional personnel are required in order to load and empty the oven, who have to monitor closely the progress of the heat treatment of the lenses.

A certain improvement is achieved with the so-called flat-bed oven which comprises a housing with a plexiglass hood. A continuous chain with holders for the moulds, which is arranged in the shape of a meander, is movably mounted inside the housing. The speed of movement of the chain is adjustable. Electrical heating elements, which provide the heat for the oven, are arranged beneath the meander-shaped chain. At one end of the housing the moulds are inserted into the holders provided on the chain, and at the other end they can be removed again. Although continuous operation is possible with that flat-bed oven, the introduction into and the removal of the moulds from the holders is carried out manually, so again additional personnel are necessary, who furthermore must be available continuously either to introduce the moulds into or to remove them from the holders. Flat-bed ovens of that kind are, moreover, relatively large; their length is up to approximately 5 m and their width approximately 1.5 m or more.

BRIEF SUMMARY OF THE INVENTION

The problem therefore exists of providing an apparatus for the heat treatment of ophthalmic lenses, especially contact lenses, that overcomes the above-described disadvantages. The novel apparatus shall in particular permit uniform heat treatment of the lenses, and the duration of the heat treatment of the lenses shall be of uniform length. The novel apparatus shall also allow continuous operation and render possible extensive automation. The apparatus shall in addition be compact in its dimensions and allow flexible use. For example it shall be possible for the apparatus to be used both for the heat treatment to polymerise the monomeric mixture and for the heat treatment of contact lenses that are to be coloured.

All of the above and also other functions are performed by a novel apparatus for the heat treatment of ophthalmic lenses, especially contact lenses, which comprises an approximately cylindrical housing of closed design having an inlet and outlet opening, transport means for transporting the ophthalmic lenses located inside the moulds along an open transport path, which is arranged inside the housing and connects the inlet and the outlet opening, and heating means arranged inside the housing, the open transport path inside the housing is according to the invention of an essentially spiral shape, and the heating means are arranged essentially above and below the transport path. The apparatus designed in that manner is best suited to continuous operation. The transport path arranged in the shape of a spiral permits a very compact design of the apparatus, even in the case of relatively long transport paths to ensure the required duration of heat treatment. The arrangement according to the invention of the heating elements ensures a very uniform heat treatment of the casting moulds transported through the apparatus and containing the monomeric mixture to be polymerised or the contact lenses to be coloured.

Since the heating means are arranged above and below the transport path roughly in the shape of a spiral and are substantially congruent with the transport path for the ophthalmic lenses, the heat radiation is concentrated on the area in which the moulds are located.

The arrangement of the heating means above and below the transport path in the form of a system of tubular heating coils through which liquid flows and which are connected to a thermostatically controllable liquid bath is particularly easy to produce. The tube system through which the heated liquid uniformly passes produces a very homogeneous heating zone, which as a result of the special arrangement of the heating spirals is concentrated precisely on the transport path of the moulds through the apparatus. In addition, that kind of heating is also very easy to control by increasing or reducing the temperature of the liquid in the liquid bath and/or varying the rate of flow of the heated liquid through the tube system. That form of heating is also relatively insensitive to variations in the surrounding temperature, since the heat capacity of the liquid bath is generally relatively high and since the liquid usually reacts relatively sluggishly to such variations in temperature. Preferably, there are arranged at various points of the transport path along which the moulds are conveyed several temperature sensors for the local monitoring of the temperature in the transport path. The sensors are coupled to heating means for the liquid bath and to pumping means for the liquid. If them are any variations of the temperature from the predetermined reference value, the temperature sensors transmit an appropriate signal for the heating rate of the heating means and/or the pumping rate of the pumps to be adjusted accordingly.

In an especially preferred arrangement, the heating means are arranged on two approximately circular plates which are arranged one above the other, spaced by about 40 mm to about 60 mm, in a fixed position inside the housing, and the transport means are formed by a rotatable turntable arranged between the upper and the lower plates. The transport path in that arrangement is provided by a guide member which is arranged approximately in the shape of a spiral on the upper plate and projects vertically therefrom in the direction of the turntable. As the turntable rotates, the moulds located on the turntable are moved from the inlet opening along the guide member across the surface of the turntable to the outlet opening.

Preferably, the turntable is arranged approximately 30 mm to approximately 35 mm below the upper plate.

In order to ensure that the moulds are transported along the transport path by the turntable, the upper side of the turntable, which faces the upper plate, is preferably provided with radially extending ribs, bars or similar carrying elements, which extend from roughly the centre of the turntable to roughly the outer rim of the turntable.

It is especially advantageous if the guide member extends at least as far as half the distance between the upper plate and the turntable, and preferably as far as just short of the ribs, bars or similar carrying elements. In that manner the heat radiated by the heating means above and below the turntable is concentrated on the transport path of the moulds, adjacent turns of the guide member defining a kind of heating channel.

Preferably, adjacent turns of the spiral guide member are spaced by about 35 mm to about 45 mm.

By selecting a material of low heat conductivity for the guide member, this acts as a thermal screening member with respect to the respective adjacent turn of the transport path.

In order to ensure as uniform an advance of the moulds as possible along the spiral-shaped transport path, the turntable is preferably motor-driven. By using a drive motor with a controllable speed of rotation it is also possible to control the speed of rotation of the turntable and, in that manner, with a given length of the transport path for the moulds in spirals over the surface of the turntable, the duration of the heat treatment of the monomeric mixture which is to be polymerised, located in the casting moulds, or of the contact lenses which are to be coloured, located in the dye moulds, can be adjusted to the required optimum times. It is particularly advantageous if the drive for the turntable is a worm gear motor.

An especially preferred and space-saving variant of the apparatus according to the invention comprises the arrangement of the inlet opening in the vicinity of the centre of the housing, with the outlet opening being provided in the region of the side wall of the housing. Preferably, the inlet opening discharges into a vertically arranged shaft which extends from the upper side of the housing through the upper plate to just short of the turntable.

It is especially advantageous if, in its outlet region above the turntable, the shaft has a roughly circular cross-section of a diameter of from approximately 30 mm to approximately 35 mm, so as to correspond to the dimensions of the currently used moulds.

In order to increase the possibility of automation of the apparatus according to the invention, a transport means, for example a continuously moving, motor-driven conveyor belt, by means of which the moulds containing the ophthalmic lenses are transported to the inlet opening, ends above and directly adjacent to the rim of the inlet opening.

An especially friction-free operation of the apparatus according to the invention is ensured by there being arranged at the outlet of the shaft above the turntable a stripper which is provided to ensure the correct positioning of the moulds containing the ophthalmic lenses.

In order to increase the possibility of automation of the operation of the apparatus according to the invention, in a preferred example embodiment the outlet opening discharges into a transport ramp, arranged outside the housing, which is oriented approximately tangentially to the circumference of the turntable.

In a further especially preferred variant, the addition of dyestuff is integrated into the apparatus. In that variant of the apparatus according to the invention, in particular, a dispensing device for a measurable amount of a dyestuff solution is provided, the outlet aperture of which is arranged downstream of the inlet opening in the region above the innermost turn of the transport path. The time at which the addition of the measured amount of dyestuff solution is triggered is preferably controlled by means of a photoelectric barrier. The photoelectric barrier is preferably in the form of an infrared light scanner and is arranged between the outlet of the feed shaft and the outlet aperture of the dispensing device in the innermost turn of the transport path. The photoelectric barrier responds only when it is passed by a mould, and triggers the correctly timed addition of dyestuff solution. An apparatus modified in such a manner is in particular especially well suited for use as a dyeing drying oven for contact lenses that are to be coloured which are mounted in dye moulds open at one end.

The many possible uses of the apparatus according to the invention are also demonstrated by the fact that it can be used in its various preferred variants not only as a dyeing drying oven but also especially as a polymerisation oven for monomeric mixture contained inside casting moulds for the manufacture of contact lenses.

In the following, the invention is explained in detail with all its essential associated components by way of an example embodiment shown partially diagramatically in the drawings wherein:

BRIEF DESCRIPTION OF THE DRAWINGS

FIG. 2 is a view along the line II—II in FIG. 1 and FIG. 3 is a perspective view of the outlet side of the apparatus according to FIG. 1.

DETAILED DESCRIPTION OF THE INVENTION

Figure 1:
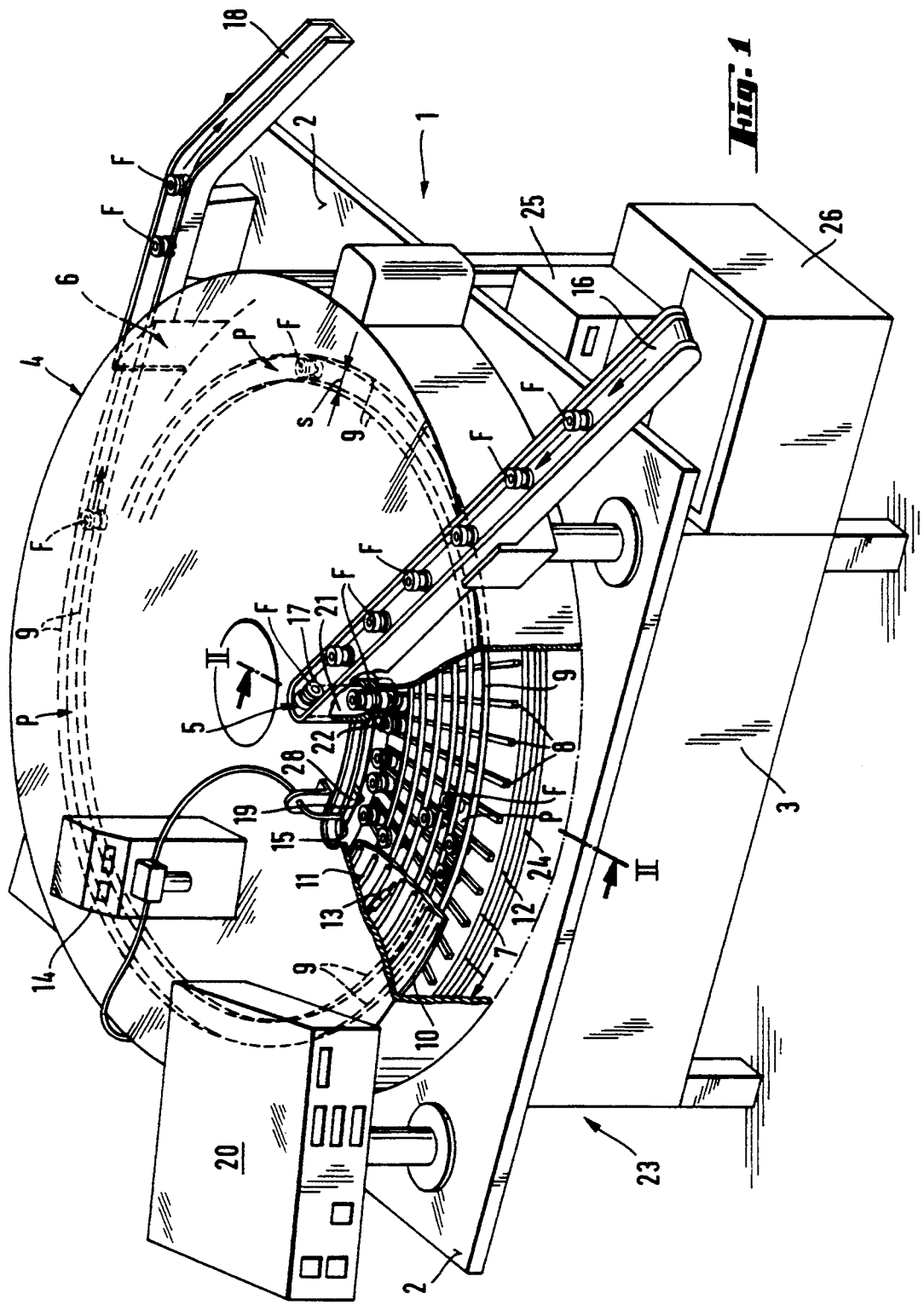
FIG. 1 is a partially cut-away perspective view of the apparatus according to the invention.

An apparatus according to the invention for the heat treatment of ophthalmic lenses, especially contact lenses, is provided as a whole with the reference numeral 1 in FIG. 1. It comprises an approximately cylindrical housing 4 of closed design having an inlet opening 5 and an outlet opening 6 (FIG. 3) at the outlet side of the apparatus. The housing 4 is arranged on a plate 2 which forms the upper portion of a table-like arrangement 23. Arranged inside the housing 4, approximately halfway up the height of the housing, is a rotatable turntable 7 with a diameter of from approximately 0.8 m to approximately 2 m, preferably approximately 1.3 m. There are provided at the upper side of the turntable roughly radially extending ribs or bars 8 or similar carrying elements, which extend roughly from the centre of the turntable 7 as far as the circumference of the turntable and have a height h of from approximately 5 mm to approximately 10 mm (FIG. 2). Two plates 10 and 24 are arranged above and below the turntable 7. The distance d between the upper plate 10 and the lower plate 24 is from approximately 40 mm to approximately 60 mm (FIG. 2). In that arrangement the turntable 7 is arranged at a distance w of from approximately 30 mm to approximately 35 mm below the upper plate 10 (FIG. 2).

Attached to the underside of the upper plate 10 is a guide member 9. This is formed by a guide sheet which is arranged in the shape of a spiral and projects vertically from the underside of the upper plate 10, one end of the guide sheet being arranged approximately in the region of the centre of the upper plate and the other end extending approximately tangentially to the circumference of the upper plate 10 in the region of the outlet opening 6 (FIG. 3) of the housing 4. Preferably, the guide member 9 consists of a material of low heat conductivity. According to FIG. 2, the distance s between two adjacent turns of the spiral guide member 9 is from approximately 35 mm to approximately 45 mm. The guide member extends here at least approximately up to half the distance w between the upper plate 10 and the turntable 7. Adjacent turns of the spiral guide member 9 in that manner define a channel-shaped transport path P which, starting from the inlet opening 5, is wound in the shape of a spiral and extends as far as the outlet opening 6. The height of the channel-shaped transport path P is approximately from 30 mm to 35 mm and its width is approximately from 35 mm to 45 mm. The total length of the transport path P is from approximately 20 m to approximately 30 m.

Heating means 11 and 12 are arranged on the upper side of the upper and lower plates 10 and 24 respectively. The arrangement of the heating means 11 and 12 is such that they each lie roughly between two adjacent turns of the spirally extending guide member 9. In the example embodiment of the invention shown in the Figures, the heating means 11 and 12 are in the form of a system of tubular heating coils. The heating coils are each connected to a liquid bath 26 which can be thermostatically controlled by a controllable heating means 25. Pumps or similar transport systems, not shown, provide a continuous flow of the thermostatically controlled heating liquid through the heating coils 11 and 12.

According to FIGS. 1 and 2, there are arranged at various points on the transport path P temperature sensors 13 which monitor locally the temperature in the channel-shaped transport path P. The temperature sensors 13 are coupled to the heating means 25 for the liquid bath 26 and to pumping means for the heating liquid. If there are any variations of the temperature from the predetermined reference value, the temperature sensors 13 transmit an appropriate signal for the heating rate of the heating means 25 and/or the pumping rate of the pumps to be adjusted accordingly and for the temperature to be stabilised at the preselected level. There is provided between the upper plate 10 and the casing of the housing 4 a heat-insulating layer 27 in which the heating coils 11 are mounted. By this means heat loss to the outside can be distinctly reduced.

The turntable 7 is connected to drive means, not shown in the Figures, which are housed in the lower portion 3 of the table-like arrangement 23. A controllable worm gear motor is preferably used as the drive means. By means of a control unit 20, which is mounted on the plate 2 and is connected to the drive means, it is possible to preselect the speed of the drive means.

The spiral channel-shaped transport path P extends from the inlet opening 5 to the outlet opening 6 of the cylindrical housing 4. In accordance with the example embodiment of the apparatus according to the invention shown in the Figures, the inlet opening 5 is arranged roughly in the vicinity of the centre of the housing 4(FIG. 1), whilst the outlet opening 6 is provided in the lateral casing of the cylindrical housing 4. The inlet opening 5 discharges into a roughly vertically arranged shaft 21, which extends from the upper side of the housing 4 through the upper plate 10 to just short of the turntable 7. The shaft has a roughly circular cross-section and is so designed that its diameter decreases in size, for example in steps, from the inlet opening 5 towards the turntable 7. Obviously, the shaft can also be designed with a substantially continuously tapering diameter. Directly before the turntable it has a diameter of from approximately 30 mm to approximately 35 mm. In the region of the channel-shaped transport path P, the side wall of the shaft 21 facing the direction of rotation is omitted somewhat above the height of the transport path P. Instead, in the upper region of the outlet of the shaft 21 a stripper 22, for example a stripping plate, extends from approximately 20 mm to approximately 40 mm in the direction of the transport path P. As shown in FIG. 1, there is arranged at least approximately 60 mm downstream of the outlet of the shaft 21, viewed in the direction of rotation of the turntable 7, an outlet aperture 15 of a dispensing device 14. The dispensing device 14 is arranged, for example, at the upper side of the cylindrical housing 4 and is connected to a reservoir, not shown, for a dyestuff solution that is to be dispensed. The outlet aperture 15 discharges, for example, through the casing of the housing 4 and through the upper plate 10 above the innermost turn of the spiral-shaped transport path P. Them may also, however, be recessed in the housing casing and in the upper plate, as shown, a viewing window 28 which extends roughly from the shaft 21 to approximately 100 mm in the direction of the innermost turn of the transport path. In that case a supply line with the outlet aperture is simply passed through the window. A photoelectric barrier 19, preferably an infrared scanner, is provided between the mouth of the outlet aperture 15 and the outlet of the shaft 21 in the region of the innermost turn of the transport path P. The photoelectric barrier is connected to the dispensing device 14 and delivers control pulses to activate dispensing of the dyestuff solution.

Ending above and directly adjacent to the lip of the inlet opening 5 is a transport means 16 which, for example, comprises a continuous motor-driven conveyor belt, the width of which corresponds approximately to the distance s between adjacent turns of the spiral-shaped guide member and which, in the example embodiment shown, rises slightly towards the inlet opening 5 like a ramp. A step 17 a few millimeters in height, for example approximately from 3 mm to 6 mm, is provided at the end of the conveyor belt directly before the inlet opening. The drive speed of the conveyor belt and the speed of rotation of the turntable 7 can be coordinated with one another.

According to FIG. 3, a transport ramp 18 of a width corresponding approximately to the distance s between adjacent turns of the spiral guide member 9 is provided adjacent to the outlet opening 6. The transport ramp is oriented approximately tangentially to the circumference of the turntable 7. The transport ramp 18 at the outlet side may, as at the inlet side, comprise a motor-driven conveyor belt, but may alternatively merely be in the form of a slide ramp, as shown.

Ophthalmic lenses, especially contact lenses, contained in casting moulds or in special dye moulds F, can be transported to the inlet opening 5 by means of the transport means 16. The moulds can be placed onto the transport means 16 by hand or by machine, and the transport means can also be a component of a larger substantially fully automated production line for ophthalmic lenses. The moulds F are transported by the conveyor belt to the inlet opening 5. At the end of the conveyor belt the lower edge of the moulds F strikes against the step 17 and the moulds tip over into the shaft 21. In the course of this the moulds are rotated through 180°, so that what was previously the underside of the moulds when they were placed on the conveyor belt then faces upwards. This operation is assisted by the use of moulds F of which one half is somewhat heavier than the other half, in which case the moulds F are placed on the conveyor belt with the lighter half at the bottom. The consequently top-heavy moulds F thus tip over all the more easily at the given position into the shaft 21. The moulds F fall down the shaft 21 and, when they have reached the bottom, are carded along by the ribs or bars 8 on the rotating turntable 7. The stripper 22 adjacent to the outlet of the shaft 21 ensures the correct positioning of each of the moulds F in the area C, which is defined by two successive carrying ribs 8, of the innermost turn of the spiral-shaped transport path P.

By means of the rotation of the turntable 7, the moulds glide along the guide member 9 slowly outwards in the direction of the circumference of the turntable 7 and the outlet opening 6, where they are transported by the transport ramp 18, for example, into a collecting vessel or are conveyed to further processing stations. Shortly after the stripper 22, the moulds pass the photoelectric barrier 19. The photoelectric barrier 19 is connected to the dispensing device 14 and responds only when passed by a mould, when, if required, it triggers the correctly timed addition of a predeterminable amount of the dyestuff solution through the subsequent outlet aperture 15 into a dye mould F, which is open at one end and in which the lens to be coloured is held. Usually about 1.0 ml to about 5.0 ml, preferably about 1.5 ml, of dyestuff solution is added. If the apparatus for the heat treatment of ophthalmic lenses is to be used for the polymerisation of a monomeric mixture contained in a casting mould F, the dispensing device 14 can be switched off.

The apparatus designed in accordance with the invention for the heat treatment of ophthalmic lenses is best suited to continuous operation. The transport path P arranged in the shape of a spiral permits a very compact design of the apparatus 1, even when the transport paths are relatively long to ensure the required heat treatment duration of from approximately 15 min. to approximately 90 min.. Where the length of the transport path P inside the apparatus 1 is from approximately 20 m to approximately 30 m, the space requirement of the apparatus is only approximately 1.6 m x 1.6 m. The arrangement according to the invention of the heating elements 11 and 12 ensures a very uniform heat treatment of the casting moulds F transported through the apparatus and containing the monomeric mixture to be polymerised or the contact lenses to be coloured. As a result of the heating coils 11 and 12 being arranged respectively above and below the transport path P in the shape of a spiral and being essentially congruent with the transport path P for the moulds F containing the ophthalmic lenses, by the screening off of the individual turns of the spiral-shaped transport path P by means of the spiral guide member 9 made of material of low heat conductivity, the heat radiation is concentrated on the region of the transport path P. During transport through the apparatus 1, each mould is always located inside a sub-area C of the transport path, which area is screened off at one side by the adjacent turns of the guide member 9 and bounded at the other side by two successive carrying ribs 8 and in which area there is a very homogeneous temperature distribution.

The heating coils 11 and 12 are passed through by the thermostatically controlled heating liquid. This allows the temperature inside the transport channel P to be controlled very easily by increasing or reducing the temperature of the liquid in the liquid bath 26 and/or altering the rate of flow of the heated liquid through the tube system. That form of heating is also relatively insensitive to variations in the surrounding temperature, since the heat capacity of the liquid bath 26 is generally relatively high and since the liquid usually reacts relatively sluggishly to such variations in temperature. In addition, there are arranged at various points of the transport path P along which the moulds F are conveyed several temperature sensors 13 which monitor the local temperature in the transport channel P. If there are any variations of the temperature from the predetermined reference value, the temperature sensors transmit an appropriate signal for the heating rate of the heating means and/or the pumping rate of the pumps to be adjusted accordingly. Preferably, temperatures of from approximately 40° C. to approximately 70° C., preferably approximately 56° C., are selected.

By using a worm gear motor of which the speed of rotation can be controlled preferably from O, with a given length of the transport path P for the moulds F the duration of the heat treatment of the monomeric mixture to be polymerised located in the casting moulds F, or of the contact lenses to be coloured located in the dye moulds F, can be adjusted to the required optimum times by altering the speed of rotation of the turntable 7.

The apparatus according to the invention is of compact design and allows continuous operation. It has a multitude of possible uses; for example it can be used as a dyeing drying oven for moulds containing a particular amount of a dyestuff solution and a contact lens to be coloured, or as a polymerisation oven for monomeric mixture contained inside casting moulds for the manufacture of contact lenses. In particular the design of the apparatus also allows it to be integrated into substantially fully automated production lines for contact lenses.

What is claimed is:

1. An apparatus for heating ophthalmic lenses, which comprises an approximately cylindrical housing having an inlet opening and an outlet opening capable of being connected with feeding and removing means for moulds containing ophthalmic lenses, said apparatus further comprising:
   an upper and a lower plate of approximately circular shape, which two plates are spaced apart from each other by a distance of about 40 mm to about 60 mm in a fixed position within said housing;
   a rotatable turntable for transporting said moulds containing opthalmic lenses from said inlet opening to said outlet opening, said rotatable turntable being disposed between said upper and lower plates;
   a spiral guide member which extends downwardly from said upper plate and determines a spirally-shaped transport path from said inlet opening to said outlet opening for said moulds containing said opthalmic lenses; and
   heating tubes which are arranged spirally above and below said rotatable turntable such that said tubes are substantially congruent with said transport path, said heating means being connected to a thermostatically-controllable liquid bath and is capable of transporting a heating liquid.

2. An apparatus according to claim 1, wherein said turntable is arranged at a distance of from approximately 30 mm to approximately 35 mm from said upper plate.

3. An apparatus according to claim 2, wherein said turntable has an upper side and an outer rim, which upper side faces the upper plate, said upper side of said turntable being provided with radially extending ribs or bars which extend radially to roughly the outer rim of said turntable.

4. An apparatus according to claim 3, wherein said guide member extends at least as far as half of said distance between said upper plate and said turntable.

5. An apparatus according to claim 1, wherein adjacent turns of said guide member are spaced by a distance of about 35 mm to about 45 mm.

6. An apparatus according to claim 1, wherein said guide member is formed as a thermal screening member with respect to a respective adjacent turn of said transport path.

7. An apparatus according to claim 1, wherein said turntable is motor-driven and wherein its speed of rotation is controllable.

8. An apparatus according to claim 7, wherein said drive for the turntable is a worm drive.

9. An apparatus according to claim 1, wherein said inlet opening is arranged in vicinity of a centre of said housing, whilst said outlet opening is provided in a side wall of said housing.

10. An apparatus according to claim 9, wherein said inlet opening discharges into a vertically arranged shaft, that extends from an upper side of said housing through said upper plate to just short of said turntable.

11. An apparatus according to claim 10, wherein said shaft has a roughly circular cross-section of a diameter of from approximately 30 mm to approximately 35 mm.

12. An apparatus according to claim 11, wherein above inlet opening there ends a continuously moving, motor-driven conveyor belt, by means of which said moulds containing said ophthalmic lenses can be transported to said inlet opening.

13. An apparatus according to claim 10, wherein above said inlet opening there ends a continuously moving, motor-driven conveyor belt, by means of which said moulds containing said opthalmic lenses can be transported to said inlet opening.

14. An apparatus according to claim 13, wherein there is arranged at an outlet of said shaft before said turntable a stripper which is provided to ensure an untilted positioning of said moulds containing said opthalmic lenses.

15. An apparatus according to claim 9, wherein said outlet opening discharges into a transport ramp, arranged outside said housing, which is oriented approximately tangentially to a circumference of said turntable.

16. An apparatus according to claim 15, wherein a dispensing device for a measurable amount of a dyestuff solution is provided, said dispensing device having an outlet aperture, which is arranged downstream of said inlet opening in a region of an innermost of said turns of said transport path.

17. An apparatus according to claim 16 wherein an infrared light scanner is arranged between said inlet opening and said outlet aperture of said dispensing device.

18. An apparatus according to claim 1 capable of being used as a dyeing drying oven for contact lenses that are to be coloured and which are mounted in dye moulds open at one end.

19. An apparatus according to claim 1 capable of being used as a polymerisation oven for polymerisation of a monomeric mixture contained inside casting moulds for the manufacture of contact lenses.

* * * * *